(12) United States Patent
Bosma et al.

(10) Patent No.: US 11,295,553 B2
(45) Date of Patent: *Apr. 5, 2022

(54) ADVANCED FEATURES FOR VEHICLE MONITORING SYSTEM

(71) Applicant: Gentex Corporation, Zeeland, MI (US)

(72) Inventors: Bradley A. Bosma, Hudsonville, MI (US); David J. Cammenga, Zeeland, MI (US); Ethan J. Lee, Byron Center, MI (US); Brian G. Brackenbury, Grand Haven, MI (US); Danny L. Minikey, Jr., Fenwick, MI (US); Mark R. Roth, Grand Rapids, MI (US); Matthew W. Remijn, Grand Rapids, MI (US); David M. Bostrom, Zeeland, MI (US); Joshua D. Lintz, Allendale, MI (US)

(73) Assignee: GENTEX CORPORATION, Zeeland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/181,364

(22) Filed: Feb. 22, 2021

(65) Prior Publication Data
US 2021/0174106 A1 Jun. 10, 2021

Related U.S. Application Data

(63) Continuation of application No. 16/715,678, filed on Dec. 16, 2019, now Pat. No. 10,929,698.
(Continued)

(51) Int. Cl.
G06V 40/60 (2022.01)
H04N 5/232 (2006.01)
(Continued)

(52) U.S. Cl.
CPC ............ *G06V 40/67* (2022.01); *G06V 40/172* (2022.01); *H04N 5/2254* (2013.01);
(Continued)

(58) Field of Classification Search
None
See application file for complete search history.

(56) References Cited

U.S. PATENT DOCUMENTS 5,928,572 A 7/1999 Tonar et al.
5,998,617 A 12/1999 Srinivasa et al.
(Continued)

FOREIGN PATENT DOCUMENTS

DE 102016213055 A1 1/2018
EP 2860718 A1 4/2015
(Continued)

Primary Examiner — James M Anderson, II
(74) Attorney, Agent, or Firm — Price Heneveld LLP; Brian James Brewer

(57) ABSTRACT

A vehicle monitoring system is configured to monitor a scanning region depicting a subject and includes a monitoring apparatus configured to capture scanning data in the scanning region depicting the subject. A feedback apparatus is configured to communicate alignment information from a portion of the vehicle to the subject. The alignment information indicates an alignment of the subject in the scanning region. A concealment apparatus is configured to conceal the scanning apparatus and selectively transmit the alignment information from the feedback apparatus. The system further includes a controller configured to activate the feedback apparatus revealing the alignment information identifying the alignment of the subject within the scanning region of the monitoring apparatus. The controller is further configured to control the scanning apparatus to capture the scanning data of the subject and monitor the subject in the scanning data.

20 Claims, 7 Drawing Sheets

Related U.S. Application Data

(60) Provisional application No. 62/780,679, filed on Dec. 17, 2018.

(51) Int. Cl.
    *H04N 5/225*     (2006.01)
    *H04N 5/235*     (2006.01)
    *G06V 40/16*     (2022.01)

(52) U.S. Cl.
    CPC ....... *H04N 5/2354* (2013.01); *H04N 5/23218* (2018.08); *H04N 5/23238* (2013.01)

(56) References Cited

U.S. PATENT DOCUMENTS

| | | |
|---|---|---|
| 6,020,987 A | 2/2000 | Baumann et al. |
| 6,037,471 A | 3/2000 | Srinivasa et al. |
| 6,137,620 A | 10/2000 | Guarr et al. |
| 6,141,137 A | 10/2000 | Byker et al. |
| 6,193,912 B1 | 2/2001 | Thieste et al. |
| 6,241,916 B1 | 6/2001 | Claussen et al. |
| 6,249,369 B1 | 6/2001 | Theiste et al. |
| 6,519,072 B2 | 2/2003 | Nishikitani et al. |
| 2004/0047050 A1 | 3/2004 | Bauer et al. |
| 2007/0115211 A1 | 5/2007 | Sun |
| 2015/0022466 A1 | 1/2015 | Levesque |
| 2017/0251092 A1 | 8/2017 | Elie et al. |
| 2018/0247037 A1 | 8/2018 | Weller et al. |
| 2018/0272992 A1 | 9/2018 | Gage |
| 2019/0031145 A1 | 1/2019 | Trelin |

FOREIGN PATENT DOCUMENTS

| | | |
|---|---|---|
| WO | 9842796 | 10/1998 |
| WO | 9902621 | 1/1999 | ns.
ADVANCED FEATURES FOR VEHICLE MONITORING SYSTEM

CROSS-REFERENCE TO RELATED APPLICATIONS

This application is a continuation of U.S. application Ser. No. 16/715,678, entitled ADVANCED FEATURES FOR VEHICLE AUTHENTICATION SYSTEM, filed on Dec. 16, 2019, now U.S. Pat. No. 10,929,698, which claims priority under 35 U.S.C. § 119(e) to and the benefit of U.S. Provisional Application No. 62/780,679 entitled ADVANCED FEATURES FOR VEHICLE AUTHENTICATION SYSTEM, filed on Dec. 17, 2018, by Bosma et al., the entire disclosure of which is incorporated herein by reference.

TECHNOLOGICAL FIELD

The present invention generally relates to a monitoring or identification system and, more particularly, to features and sensor configurations related to an authentication system.

SUMMARY OF THE DISCLOSURE

According to one aspect of the present disclosure, a vehicle monitoring system is disclosed. The system is configured to monitor a scanning region depicting a subject and includes a monitoring apparatus configured to capture scanning data in the scanning region depicting the subject. A feedback apparatus is configured to communicate alignment information from a portion of the vehicle to the subject. The alignment information indicates an alignment of the subject in the scanning region. A concealment apparatus is configured to conceal the scanning apparatus and transmit the alignment information from the feedback apparatus. The system further includes a controller configured to activate the feedback apparatus revealing the alignment information identifying the alignment of the subject within the scanning region of the monitoring apparatus. The controller is further configured to control the scanning apparatus to capture the scanning data of the subject and monitor the subject in the scanning data.

According to another aspect of the disclosure, a method for presenting alignment information for aligning a subject within a scanning region of a monitoring apparatus is disclosed. The method comprises capturing scanning data in the scanning region depicting a subject and activating a feedback apparatus displaying alignment information on a portion of the vehicle. The alignment information indicates an alignment of the subject in the scanning region. The method further includes updating the alignment information for the monitoring apparatus displayed to the subject based on a position of the subject in the scanning region and transmitting the alignment information from the feedback apparatus through a concealment apparatus configured to conceal the scanning apparatus. The scanning data captured by the monitoring apparatus that depicts the subject is monitored.

According to yet another aspect of the disclosure, a vehicle monitoring system configured to monitor a scanning region depicting a subject is disclosed. The system comprises a monitoring apparatus configured to capture scanning data in the scanning region depicting the subject. A proximity sensor is in communication with the controller. The proximity sensor is configured to communicate a detection signal identifying the subject in the scanning region. A feedback apparatus is configured to communicate alignment information from a portion of the vehicle to the subject. The alignment information indicates an alignment of the subject in the scanning region. A concealment apparatus is configured to conceal the scanning apparatus and transmit the alignment information from the feedback apparatus. A controller is in communication with the scanning apparatus and the feedback apparatus. The controller is configured to activate the feedback apparatus revealing the alignment information identifying the alignment of the subject within the scanning region of the monitoring apparatus and control the scanning apparatus to capture the scanning data of the subject based on the detection signal. The controller further monitors the subject in the scanning data. Monitoring the subject includes capturing the scanning data depicting identifying information.

These and other features, advantages, and objects of the present invention will be further understood and appreciated by those skilled in the art by reference to the following specification, claims, and appended drawings.

DETAILED DESCRIPTION

Figure 1:
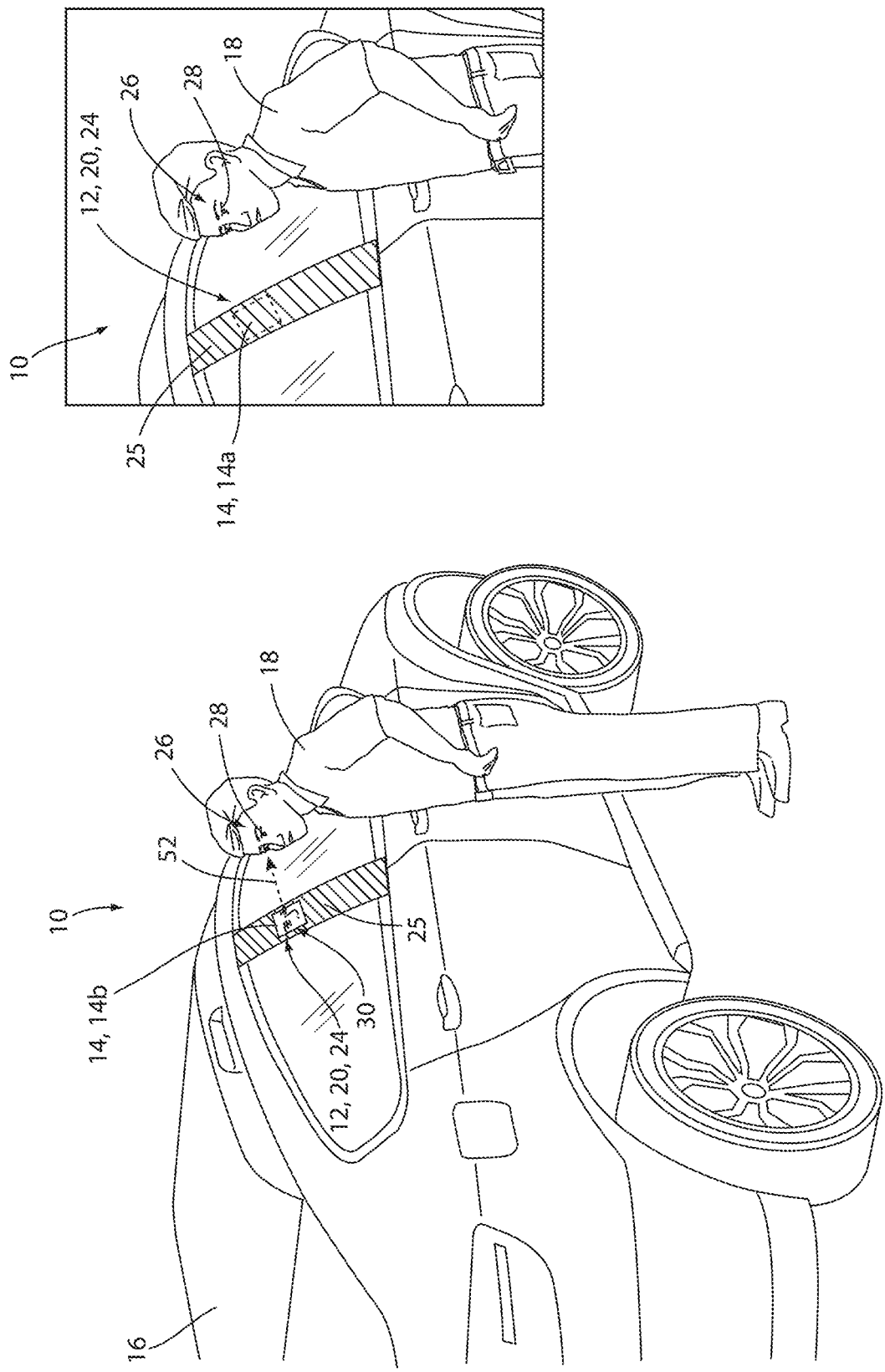
FIG. 1 is an illustrative view of an authentication system comprising a scanning apparatus and a concealment apparatus incorporated in an automotive vehicle.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the element closer to an intended viewer of the mirror element, and the term "rear" shall refer to the surface of the element further from the intended viewer of the mirror element. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Figure 2:
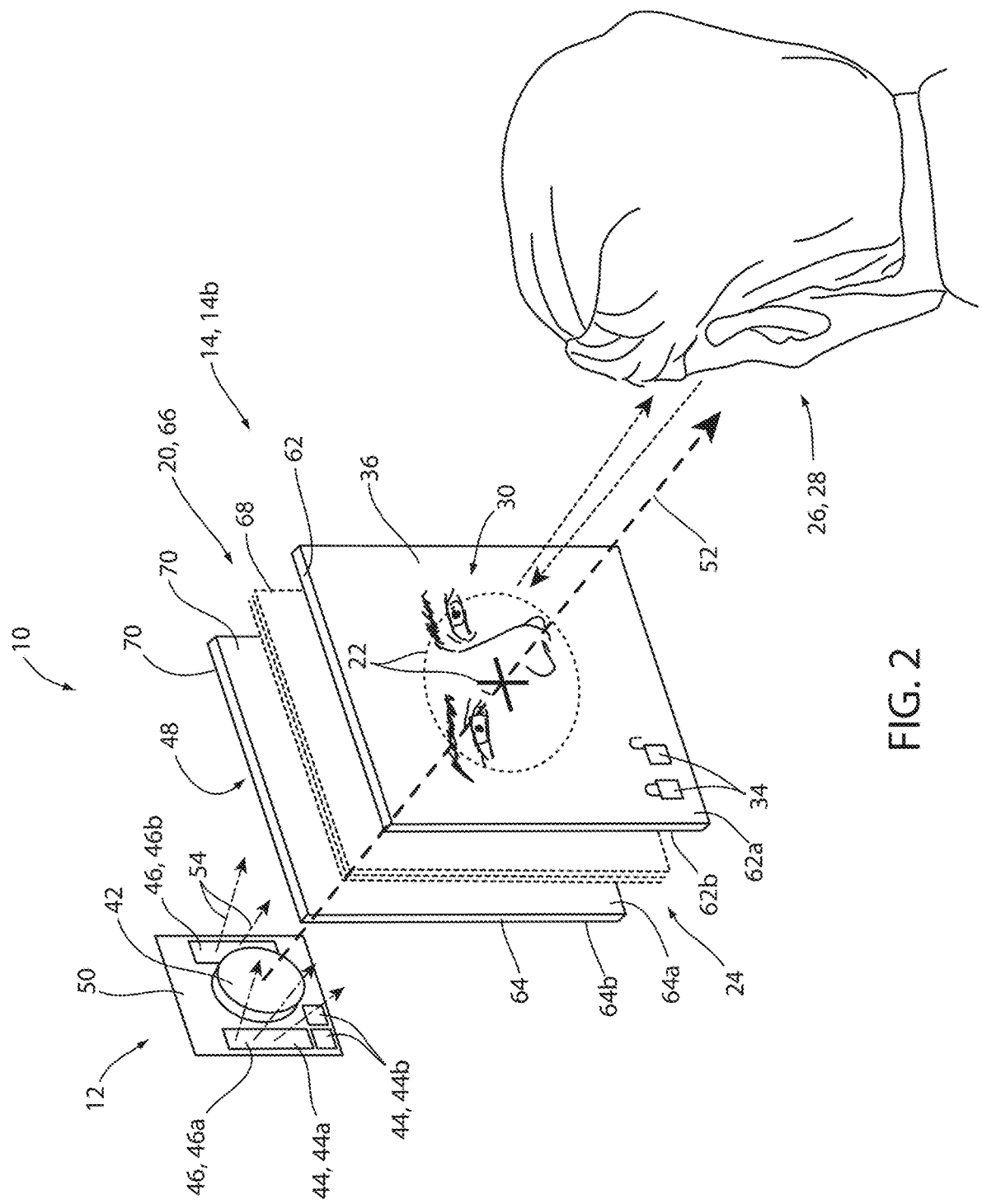
FIG. 2 is a cross-sectional view of a scanning apparatus and a concealment apparatus.

Referring to FIGS. 1 and 2, an exemplary embodiment of an authentication system 10 is shown. In general, the system 10 may comprise a scanning apparatus 12 configured to capture data that may be used to identify and authenticate a potential user or operator. In some embodiments, the system 10 may be configured to capture biometric data in the form of image data, which may be processed by a controller to load, authorize, unlock, and/or verify one or more privileges, actions, and/or transactions associated with the system 10. The disclosure may provide for the system 10 to be implemented in a number of ways. For example, in some embodiments, the system may comprise a display screen configured to provide a preview of the scanning data or image data captured by the scanning apparatus. In some embodiments, the system may also or alternatively provide for visual feedback identifying the content of the scanning data via a reflective device or mirror. In this way, the system 10 may be configured to capture the scanning data and provide feedback to an operator or user in a number of ways.

In various embodiments, the system 10 may comprise a scanning apparatus 12.

As demonstrated in FIG. 1, the system 10 may additionally comprise a concealment apparatus 14, which may be configured to selectively mask or hide the scanning apparatus 12 and/or a feedback apparatus 15. As further discussed in reference to various embodiments herein, the feedback apparatus 15 may be configured to visually represent an extent or content of the scanning data such that a position or orientation of the operator or user may be adjusted. In this way, the system 10 may provide feedback information, alignment information, and/or instructions to ensure that the system may operate effectively without undue hardship for users. In this way, the system 10 may be incorporated in a portion of the vehicle 16 or similar structure in a way that disguises or masks the system 10 from view.

As shown in FIG. 1, the system 10 may be incorporated in an automotive vehicle 16. However, the system 10 may be implemented in a variety of settings to provide authentication for access to barriers or entry doors, authorization of transactions (e.g. banking transactions, purchases, etc.), and various additional applications that may benefit from secure authorization of a user 18. In some embodiments, the concealment apparatus 14 may provide for the location of the scanning apparatus 12 and/or the feedback apparatus 15 to be concealed such that the incorporation in the vehicle may not be visibly apparent or perceptible. In some embodiments, the concealment apparatus 14 may be configured to change from a concealed configuration 14a to a scanning configuration 14b. Similarly, in some embodiments, one or more components of the system 10 may only be visible from predefined angles or positions in relation to the vehicle 16. In this way, the disclosure may provide for a flexible solution that may be implemented in a variety of ways to suit a desired operation or application.

In some embodiments, the scanning apparatus 12 may be disposed or incorporated in various portions of the vehicle 16 to provide for access to various compartments or portions of the vehicle 16. For example, the user 18 may be authorized to access a trunk of the vehicle to receive a delivery or collect an item. In this way, the system 10 may provide for selective access through one or more gates, doors, access panels and may additionally be operable to provide an authorization for a user to complete various operations or transactions. Accordingly, the scanning apparatus 12 may be incorporated in various portions of the vehicle 16 (e.g. a pillar, trunk, spoiler, hood, roof, etc.) or various other structures for convenient incorporation in a variety of environments. The various beneficial aspects of the system 10 are further discussed in the following detailed description.

In some embodiments, the scanning apparatus 12 may be operable to perform an identification function, which may be activated upon detection of the user 18 interacting or being detected proximate to the scanning apparatus 12. Once activated, a controller of the system 10 may control an electro-optic device 20 to change a transmittance of the concealment apparatus 14. In response to the activation, the controller may apply a control to an electrical signal (e.g. a voltage potential) applied to the electro-optic device 20 to change the electro-optic device 20 from a low transmittance state in the concealed configuration 14a to a substantially transparent or light transmissive state in the scanning configuration 14b. For example, the low transmittance state may be substantially color and reflection matched relative to a neighboring or adjacent panel 25, which may not require a complete opacity or suppression of transmitted light. In some examples, the low transmittance state may still allow for the transmission of approximately 5-25% or 5-15% of light while achieving sufficient visible concealment to disguise the scanning apparatus 12 and/or the feedback apparatus 15 from view. In this way, the controller may selectively reveal the location of the scanning apparatus 12 such that the user 18 may align one or more identifying features (e.g. a face, iris, fingerprint, palm print and outline, etc.) with the scanning apparatus 12. Accordingly, the system 10 may be configured to be selectively revealed to the user 18 to process an authentication or identification routine.

In operation, the low transmission state of the electro-optic device 20 may not only reduce the transmission of visible or other light but may also adjust a color of the light transmitted through an electro-optic medium of the electro-optic device 20. Accordingly, in some implementations, the electro-optic device 20 may be configured to reflect a hue of light that provides similar visual properties to a neighboring panel 25. For example, if the panel 25 neighboring or surrounding the electro-optic device 20 reflects light having a hue comprising one or more of a plurality of colors, the electro-optic medium and various layers of the electro-optic device 20 may be configured to similarly reflect and/or selectively transmit similar colors, such that the low transmission state effectively matches the color of the neighboring panel 25.

In some embodiments, the concealment apparatus 14 may additionally comprise the feedback apparatus 15 comprising an alignment feature 22. The alignment feature 22 may be provided in the form of a mirror device 24, which may be selectively revealed in the scanning configuration 14b. The mirror device 24 may be incorporated or formed as a constituent layer of the electro-optic device 20 as shown in FIG. 2. The mirror device 24 may provide for a visual alignment tool for the user 18 to align a facial feature 26, eye 28, and/or various identifying features with the scanning apparatus. For example, the user 18 may view a reflection 30 of the identifying feature in the mirror device 24 to align the feature with the scanning apparatus 12. In some embodiments, the mirror device 24 may comprise one or more alignment features 22 as well as light indicators 34, which may assist the user 18 to align the reflection 30 of the identifying feature and indicate a status of the authentication processed by the system 10, respectively.

In the concealed configuration 14a, the system 10 may be configured to control the concealment apparatus 14 to match an appearance of a panel 25, which may be located neighboring or adjacent to the concealment apparatus 14. As shown in FIG. 1, the concealment apparatus 14 may be controlled by the controller of the system 10 to adjust a state of the electro-optic device 20 to a decreased or limited transmission condition to achieve the concealed configuration 14a. In the concealed configuration 14a, the concealment apparatus 14 may be darkened to a limited transmission state, which may be controlled based on one or more chemical properties of an electro-optic medium of the electro-optic device 20. In an exemplary embodiment, the electro-optic device 20 may be configured to transition from a black appearance in the concealed configuration 14a to a comparatively transparent appearance in the scanning configuration 14b. In this way, the controller of the system 10 may be configured to adjust the appearance of an exterior surface 36 to change from a colored appearance that substantially matches the panel 25 to a light transmissive state configured to reveal the mirror device 24. Accordingly, the system 10 may provide for the mirror device 24 to be selectively revealed to assist the user 18 in alignment with the scanning apparatus 12.

Referring now to FIG. 2, in some embodiments, the scanning apparatus 12 may provide for the system 10 to identify or authenticate the user 18 of a vehicle 16 based on the eye-scan identification function. The eye-scan-identification function may utilize an infrared illumination of an iris of the eye 28 in order to illuminate the eye 28 for the identification. Such illumination may be optimized in conditions allowing for a high optical transmittance in the near-infrared (NIR) range. In some embodiments, the disclosure may provide for an electrochromic (EC) stack of the electro-optic device 20 that may have a high light transmittance in the NIR range, for example, wavelengths of light ranging from 800 nm to 940 nm. In some embodiments, the range of wavelengths may comprise a range from approximately 700 nm-940 nm. Additionally, in some implementations, the electro-optic device 20 may comprise a plurality of light sources 44 configured to illuminate at least one iris of the user 18 of the vehicle 16.

To provide for the eye-scan-identification function, for example, an iris scan, an image sensor 42 of the scanning apparatus 12 may be disposed proximate to a rear surface of the electro-optic device 20. The image sensor 42 may correspond to, for example, a digital charge-coupled device (CCD) or complementary metal-oxide-semiconductor (CMOS) active pixel sensor, although may not be limited to these exemplary devices. The image sensor 42 may be in communication with at least one light source 44, which may correspond to one or more infrared emitters 44a configured to output an emission 54 of light in the NIR range (e.g. 700 nm to 940 nm, 750 nm-800 nm, etc.). In some embodiments, wavelengths ranging from 750 nm to 800 nm may be utilized for the emission or 750 nm-to 800 nm to suit one or more iris recognition functions. In this configuration, the image sensor 42 may be configured to selectively activate the one or more infrared emitters 44a corresponding to the at least one light source 44 to illuminate the iris such that an identity of a user 18 of the vehicle 16 may be determined.

The infrared emitters 44a or the light sources 44 may correspond to a plurality of infrared emitter banks. Each of the infrared emitter banks 46 may comprise a plurality of light emitting diodes, which may be grouped in a matrix or otherwise grouped and disposed behind a rear surface 48 of the electro-optic device 20. In an exemplary embodiment, the plurality of light sources 44 may correspond to a first emitter bank 46a and a second emitter bank 46b. In this configuration, each of the emitter banks 46 may be configured to output the emission 54 in the NIR range or other wavelengths of light from the exterior surface 36. In this configuration, the scanning apparatus 12 may be configured to illuminate the eye 28 or eyes of the user 18 such that the image sensor 42 may capture image data including details of the iris or irises.

In an exemplary embodiment, each of the first emitter bank 46a and/or the second emitter bank 46b may correspond to more or fewer LEDs or banks of LEDs. In some embodiments, the electro-optic device 20 and the mirror device 24 may have a high level of transmittance in the NIR range. Examples of electro-optic assemblies having a high level of transmittance in the NIR range may correspond to assemblies comprising the mirror device 24 having a transflective dielectric coating disposed on a fourth surface of the electro-optic device as further disclosed herein. In some embodiments comprising an electro-optic device 20 having a lower level of transmittance in the NIR range, the scanning apparatus 12 may utilize a greater number of or more intense LEDs. Electro-optic assemblies having a lower level of transmittance in the NIR range may correspond to assemblies comprising the mirror device 24 having a metal-based, transflective coating disposed on a third surface of the electro-optic device.

The image sensor 42 may be disposed on a circuit 50, for example, a printed circuit board in communication with a controller. The controller may further be in communication with various devices that may be incorporated in the vehicle 16 via the communication bus or any other suitable communication interface. The controller may correspond to one or more processors or circuits, which may be configured to process image data received from the image sensor 42. In this configuration, the image data may be communicated from the image sensor 42 to the controller. The controller may process the image data with one or more algorithms configured to determine an identity of the user 18 of the vehicle 16. Further detailed discussion of the controller and the various devices that may be in communication therewith are discussed in reference to FIG. 7.

The alignment feature 22 may be formed as a portion of the mirror device 24 and may be visible by the user viewing the exterior surface 36 of the concealment apparatus 14 in the scanning configuration 14b. In this configuration, a field of view of the image sensor 42 may be directed in a detection direction 52 configured to capture reflected light from detection emissions 54 output from the infrared emitters 44a. The alignment feature 22 may be aligned with the field of view of the image sensor 42 along the detection direction 52 such that the user 18 may align the identifying feature (e.g. the facial feature 26, eyes 28, etc.) with the field of view of the image sensor 42 by aligning the reflection 30 of the identifying features with the mirror device 24. The alignment feature 22 may correspond to one or more shapes or patterns that may be visible in the reflection 30. In an exemplary embodiment, the alignment feature 22 may be etched or laser ablated into the mirror device 24. In this configuration, the system 10 may provide for visible markers on the exterior surface 36 enabling the user to align the identifying features (e.g. the facial features 26, eyes 28, etc.).

The indicators 34 may be in communication with the controller and configured to output a signal to identify a state of the scanning apparatus 12. The indicator 34 may correspond to or be aligned with the light sources 44, which may correspond to visible light sources 44b. The visible light sources 44b may be operable to flash and/or change colors to communicate a state of the scanning apparatus 12. In an exemplary embodiment, the indicators 34 may be aligned with one or more etched or laser-ablated portions of the mirror device 24 such that visible light from the visible light sources 44b may pass through the mirror device 24 and illuminate the indicators 34. The visible light sources 44b may comprise light emitting diodes (LED), and in an exemplary embodiment, the visible light sources 44b may correspond to a red, green, and blue (RGB) LED operable to identify the state of the scanning apparatus 12 by outputting one or more colored emissions of light.

Still referring to FIG. 2, as previously discussed, the feedback apparatus 15 may comprise the mirror device 24. The mirror device 24 may form a portion of the electro-optic device 20. The mirror device 24 may include a first substrate 62 having a first surface 62a and a second surface 62b. The mirror device 24 may further comprise a second substrate 64 having a third surface 64a and a fourth surface 64b. The first substrate 62 and the second substrate 64 may define a cavity 66 and may be substantially parallel. The first surface 62a and the third surface 64a may be oriented toward the exterior surface 36 of the concealment apparatus 14. The second surface 62b and the fourth surface 64b may be oriented toward the rear surface 48. In this configuration, the contents of the housing including the image sensor 42 and the light source(s) 44 may be significantly hidden from view by the concealment apparatus 14.

Though demonstrated in FIG. 2 as being disposed behind the concealment apparatus 14, the image sensor 42 and the infrared emitters 44a may be alternatively positioned in various embodiments. For example, in some embodiments, the concealment apparatus 14 may be configured to disguise the mirror device 24 (e.g. the alignment apparatus) as well as the one or more alignment features 22. However, the image sensor 42 may be hidden or mounted elsewhere on the vehicle 16. For example, the image sensor may 42 may be concealed by one or more materials, panels, and/or coatings that are transmissive in the NIR range of light. Such materials may disguise the image sensor 42 and the infrared emitters 44a from view without limiting their operation. In this way, the image sensor 42 and the infrared emitters 44a may be positioned to orient the field of view of the image sensor 42 along the detection direction 52 such that the user 18 may align with the identifying feature (e.g. the facial feature 26, eyes 28, etc.) even though the image sensor 42 and the infrared emitters 44a may not necessarily be aligned behind the concealment apparatus 14.

The cavity 66 may contain an electro-optic medium 68, such as, but not limited to, an electrochromic medium. The cavity 66 may be completely or partially filled with the medium 68. The concealment apparatus 14 may be in communication with a dimming controller via electrical contacts and may comprise various seals to retain the medium 68 in the cavity 66. In this configuration, the concealment apparatus 14 may correspond to an electrochromic mirror element configured to vary in reflectivity in response to a control signal received from the dimming controller via the electrical contacts. The control signal may change an electrical potential supplied to the concealment apparatus 14 to control the reflectivity. In some embodiments, the mirror device 24 may be implemented as a transflective coating 70, which may typically be disposed on the third surface 64a. The transflective coating 70 may typically comprise a layer containing silver along with additional layers, such as metal, dielectric and/or transparent conducting oxides located above or below the silver comprising layer or both.

In some embodiments, the transflective coating 70 may be implemented as a transflective dielectric coating that may be applied to the fourth surface 64b. The transflective dielectric coating may be used as an alternative to a metal-based coating for the transflective coating 70. The transflective dielectric coating may be designed to resolve the issues related to the limited transmission in the NIR range for the concealment apparatus 14 and provide NIR transmittance greater than about 20%. Additionally, the dielectric coating can be designed to adjust the color and appearance of the concealment apparatus 14 to match the color and reflection of the neighboring panel 25 in the low transmittance state. In this way, the disclosure provides for the concealment apparatus to be adjusted or color tuned to effectively match various visual appearances of panels and portions of the vehicle 16.

In some embodiments, the system 10 may further comprise a proximity sensor 72. The proximity sensor 72 may correspond to a capacitive sensor, radar sensor, Doppler sensor, ultrasonic sensor, image or light sensor, or various other sensors that may be configured to identify the user 18 proximate the vehicle 16. In various embodiments, the controller of the system may monitor signals from the proximity sensor 72 and selectively activate various portions of the system 10 in response to the presence of the user 18. For example, in response to the detection of the user 18 within a detection region, the controller may selectively control the concealment apparatus 14, the scanning apparatus 12, as well as one or more illumination sources, display devices, and various devices in communication with the controller of the system 10. In addition, or alternatively, the system may monitor inputs from a user interface, which may operate in response to the proximity sensor 72 or additional sensors that may be incorporated in the vehicle 16.

Figure 3:
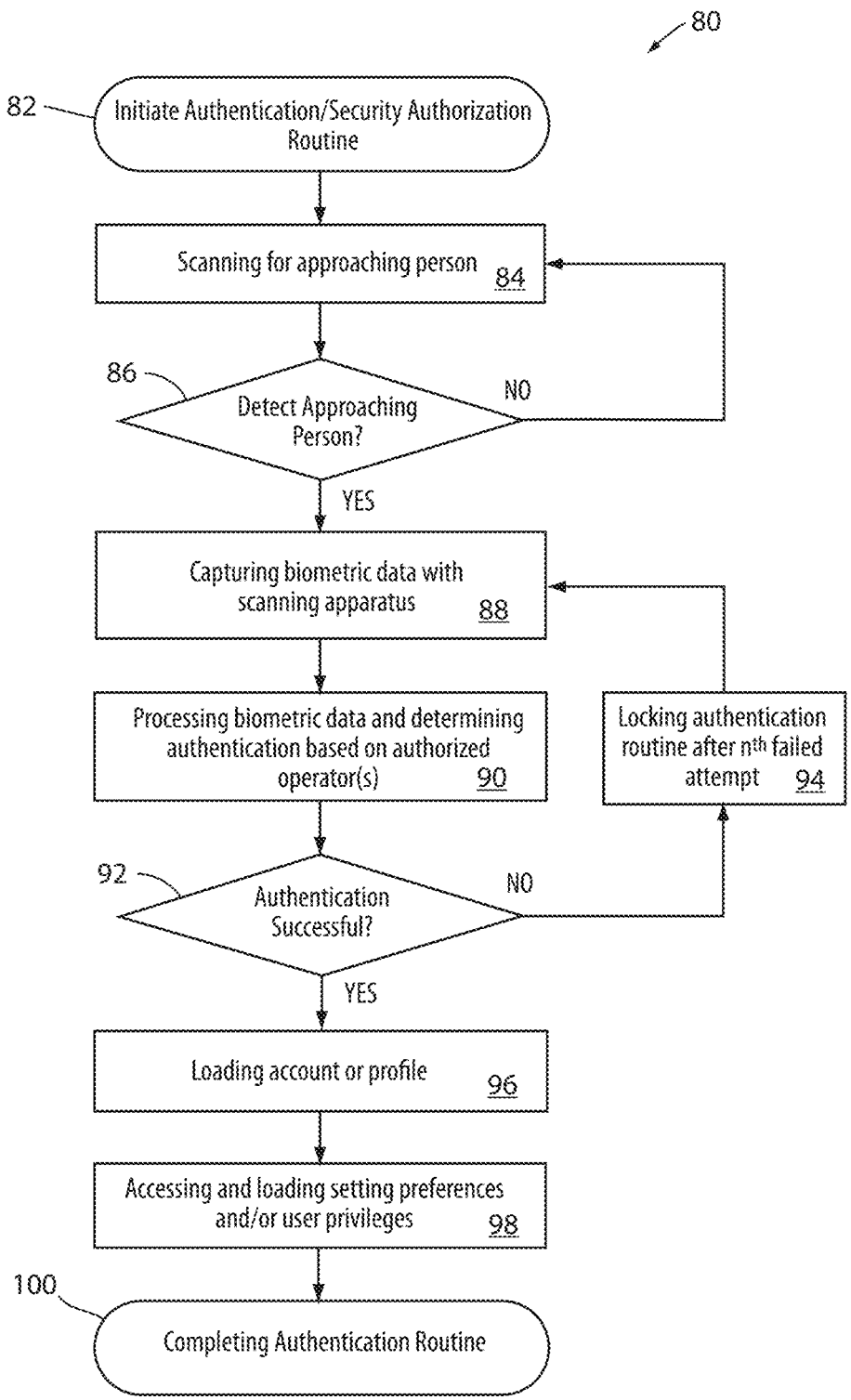
FIG. 3 is a flowchart demonstrating a method of controlling an authentication system comprising a scanning apparatus and a concealment apparatus.

Referring now to FIG. 3, a flowchart demonstrating a method 80 for controlling the system 10 is shown. The method 80 may begin with the controller of the system 10 initializing an authentication or security authorization routine (82). The method 80 may continue by scanning a region proximate the scanning apparatus 12 for the user 18 (84). The controller may utilize the image sensor 42 or various sensors of the vehicle 16. If the user 18 is not detected in step 86, the controller may continue the scan in step 84. If the user is detected in step 86, the controller may continue to step 86 and control the concealment apparatus 14 to change from the concealed configuration 14a to the scanning configuration 14b. In the scanning configuration 14b, the controller may activate the scanning apparatus 12 to capture biometric data in a field of view of the image sensor 42 (88).

Once the concealment apparatus 14 is in the scanning configuration 14b, the user 18 may align the identifying feature (e.g. the facial feature 26, eye 28, etc.) with the scanning apparatus 12 by viewing the reflection 30 in the mirror device 24. As the user 18 aligns the identifying feature with the scanning apparatus 12, the controller may process the biometric data and determine an authentication or identification of the user 18 (90). Upon receiving and processing the biometric data, the controller may identify if the authentication is successful (92). If the authentication is not successful or the user 18 has not sufficiently aligned the identifying feature with the scanning apparatus 12, the controller may continue to control the scanning apparatus to capture the biometric data in step 88. In step 92, the controller may also determine if the authentication is unsuccessful due to the biometric data corresponding to an unknown or unauthorized user. In such circumstances, the controller may track unsuccessful authorization or authentication attempts and lock the authentication routine after a predetermined number (e.g. n attempts) of unsuccessful attempts (94).

In some examples, the system 10 may also be configured to communicate a notification of a failed authentication attempt. Such a notification may be communicated to a mobile device of an owner or authorized user of the vehicle 16. The notification may be communicated from a controller of the system 10 to the mobile device and/or additional remote devices via one or more communication circuits, which may be in communication with the controller. Accordingly, the system 10 may be configured to communicate a notification to the mobile device and/or output a variety of notifications related to the operation of the system 10, the vehicle 16, etc. The controller is further discussed in reference to FIG. 7.

In step 92, if the controller successfully authenticates or identifies an authorized user, the controller may access a profile or account for the authorized user (96). The controller of the system 10 may further access and/or load a privilege or authorization level as well as various settings for the authorized user (98). The privileges or authorization level of the user may provide the user access a barrier or similarly authorize a transaction. In this way, the system 10 may provide the authorized user access to the vehicle 16 and/or provide an authentication of a pending transaction. Following step 98, the method 80 may conclude in step 100.

Figure 4A:
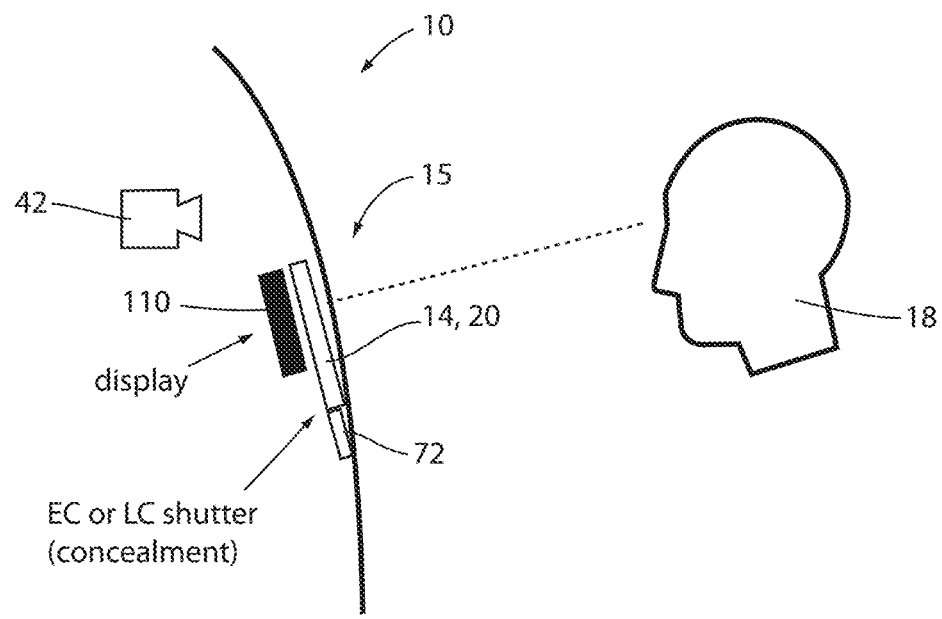
FIG. 4A is a schematic diagram of a scanning apparatus comprising a feedback apparatus in the form of a visual display.

Referring now to FIG. 4, the system 10 is demonstrating a number of variations for the feedback apparatus 15 that may be utilized alone or in combination. Accordingly, the flexible solutions implemented in the feedback apparatus 15 may be combined to provide optional feedback mechanisms to improve or provide options for the operation of the system without departing from the spirit of the disclosure. For example, referring first to FIG. 4A, the system is shown comprising the feedback apparatus 15 in the form of a display screen 110. In operation, the display screen 110 may be configured to display the scanning data or image data received from the image sensor 42. Additionally, the concealment apparatus 14 (e.g. the electro-optic device 20, liquid crystal layer, etc.) may be disposed in front of the display screen 110. In this configuration, the controller of the system 10 may be configured to control the concealment apparatus 14 by adjusting the transmission state of the electro-optic device 20 as discussed herein.

In operation, in response to detecting the presence of the user 18 proximate the vehicle 16, the controller may activate the display screen 110 to display the image data captured by the image sensor 42. Additionally, the controller may control the electro-optic device 20 to change from the darkened or limited transmission state to the substantially transparent state to reveal the display screen 110. Similarly, a liquid crystal shutter may be utilized to mask the appearance of the display screen 110 in a first configuration and transmit light from the display screen in a second configuration. In this way, the controller of the system 10 may be configured to adjust the appearance of the exterior surface 36 to change from the colored appearance or limited transmission state that substantially matches the panel 25 to a light transmissive state configured to reveal the display screen 110, such that light representing the image data from the image sensor 42 may be revealed to the user 18. Accordingly, the system 10 may provide for the concealment apparatus 14 to reveal the feedback apparatus 15, such that the user 18 may align one or more features with the alignment features 22, which may be displayed on the display screen 110. Additionally, the controller may display one or more instructions for alignment on the display screen 110.

Figure 4B:
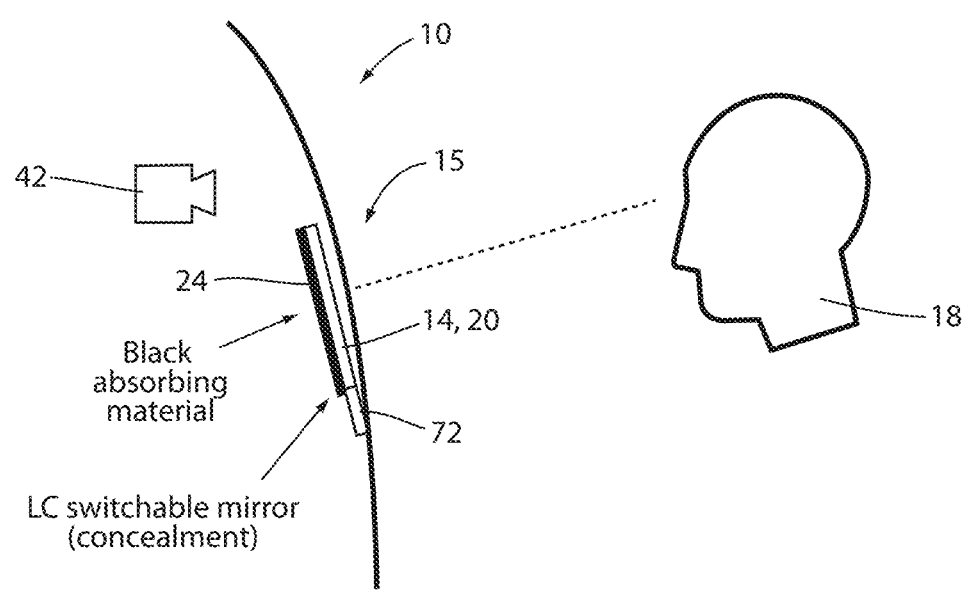
FIG. 4B is a schematic diagram of a scanning apparatus comprising a feedback apparatus in the form of a reflective device.

Referring to FIG. 4B, in another example, the feedback apparatus 15 may be implemented in the form of the mirror device 24. As previously discussed, the mirror device 24 may be incorporated or formed as a constituent layer of the electro-optic device 20 as shown in FIG. 2. The mirror device 24 may provide for a visual alignment tool for the user 18 to align a facial feature 26, eye 28, and/or various identifying features with the scanning apparatus. For example, the user 18 may view a reflection 30 of the identifying feature in the mirror device 24 to align the feature with the scanning apparatus 12. In some embodiments, the mirror device 24 may comprise one or more alignment features 22 as well as light indicators 34, which may assist the user 18 to align the reflection 30 of the identifying feature and indicate a status of the authentication processed by the system 10, respectively.

In the concealed configuration 14a, the system 10 may be configured to control the concealment apparatus 14 to match an appearance of a panel 25, which may be located neighboring or adjacent to the concealment apparatus 14. As shown in FIG. 1, the concealment apparatus 14 may be controlled by the controller of the system 10 to adjust a state of the electro-optic device 20 to a substantially limited light transmission condition to achieve the concealed configuration 14a. In the concealed configuration 14a, an exterior surface 36 of the concealment apparatus 14 may be darkened to an opaque color, which may correspond to one or more chemical properties of an electro-optic medium 68 of the electro-optic device 20. In an exemplary embodiment, the electro-optic device 20 may be configured to transition from a black appearance in the concealed configuration 14a to a comparatively transparent appearance in the scanning configuration 14b. In this way, the controller of the system 10 may be configured to adjust the appearance of the exterior surface 36 to change from a colored appearance that substantially matches the panel 25 to a light transmissive state configured to reveal the mirror device 24. Accordingly, the system 10 may provide for the mirror device 24 to be selectively revealed to assist the user 18 in alignment with the scanning apparatus 12.

Figure 5:
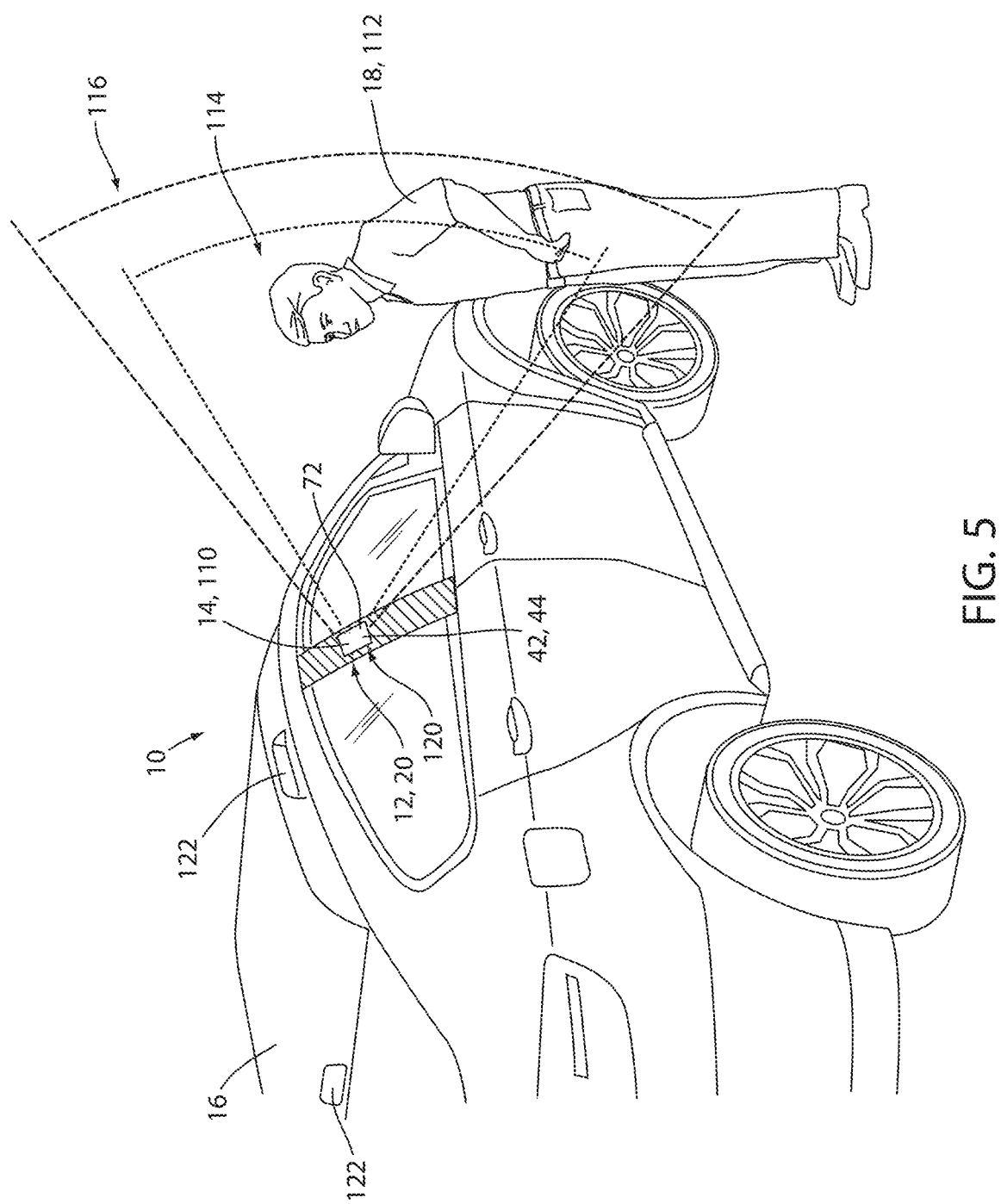
FIG. 5 is a pictorial view of a vehicle comprising an authentication system.

Referring now to FIG. 5, as previously discussed, the system 10 may be configured to activate the one or more devices, peripherals, and/or vehicle components in communication with the controller. For example, in response to the presence of the user 18, the controller may selectively activate various portions of the system 10. The presence of the user 18 or more generally of a person 112 may be detected by the image sensor 42 and/or the proximity sensor 72. As shown, the image sensor 42 may comprise a field of view 114, and the proximity sensor 72 may comprise a detection region 116, each of which may be configured to detect an object and/or the person 112 within a predetermined distance or monitoring range. In response to the detection of the person 112 within the field of view 114 and/or the detection region 116, the controller may selectively activate the one or more devices, peripherals, and/or vehicle components.

For example, in response to the detection via one of the sensors 120 (e.g. the image sensor 42, the proximity sensor 72, etc.), the controller of the system 10 may selectively control the concealment apparatus 14, the scanning apparatus 12, as well as one or more illumination sources, display devices, and various devices in communication with the controller of the system 10. In addition, or alternatively, the system 10 may monitor inputs from a user interface, which may operate in response to the proximity sensor 72 or additional sensors that may be incorporated in the vehicle 16.

In an exemplary embodiment, the controller may be configured to capture an image of the object or person 112 in response to a detection of the object or person 112 within a predetermined distance. In some embodiments, the controller may similarly be configured to capture image data of the user 18 in response to a successful or unsuccessful completion of the authentication method 80 or similar methods as discussed herein. In response to capturing the image data, the controller may communicate the image data to a remote or mobile device, outside server, and/or save the image data for later review in response to a security issue, damage, or for any other purposes. Accordingly, the system may be configured to detect the person 112 and/or object (e.g. a vehicle, etc.) proximate to the vehicle 16 and capture image data, which may be used to identify the object or person 112.

In some examples, the image sensor 42, the light source 44, the proximity sensor 72, the display device 110, and/or various other devices in communication with the system 10 may be implemented in combination with additional systems of the vehicle 16. For example, in some embodiments, the system 10 may be implemented as a component or controller of a camera monitoring system and/or advanced driver assistance system (ADAS). For example, the image data captured in the field of view 114 by the image sensor 42 may be combined by the controller with additional image data captured by additional image sensors 122. The additional image sensor 122 may be distributed in various portions of the vehicle 16. Similarly, the proximity sensor 72 and/or the image sensor 122 may be utilized as a sensor of a blind spot monitoring system, a lane keep system, or various other assistance systems that may be implemented for the vehicle 16.

Figure 6:
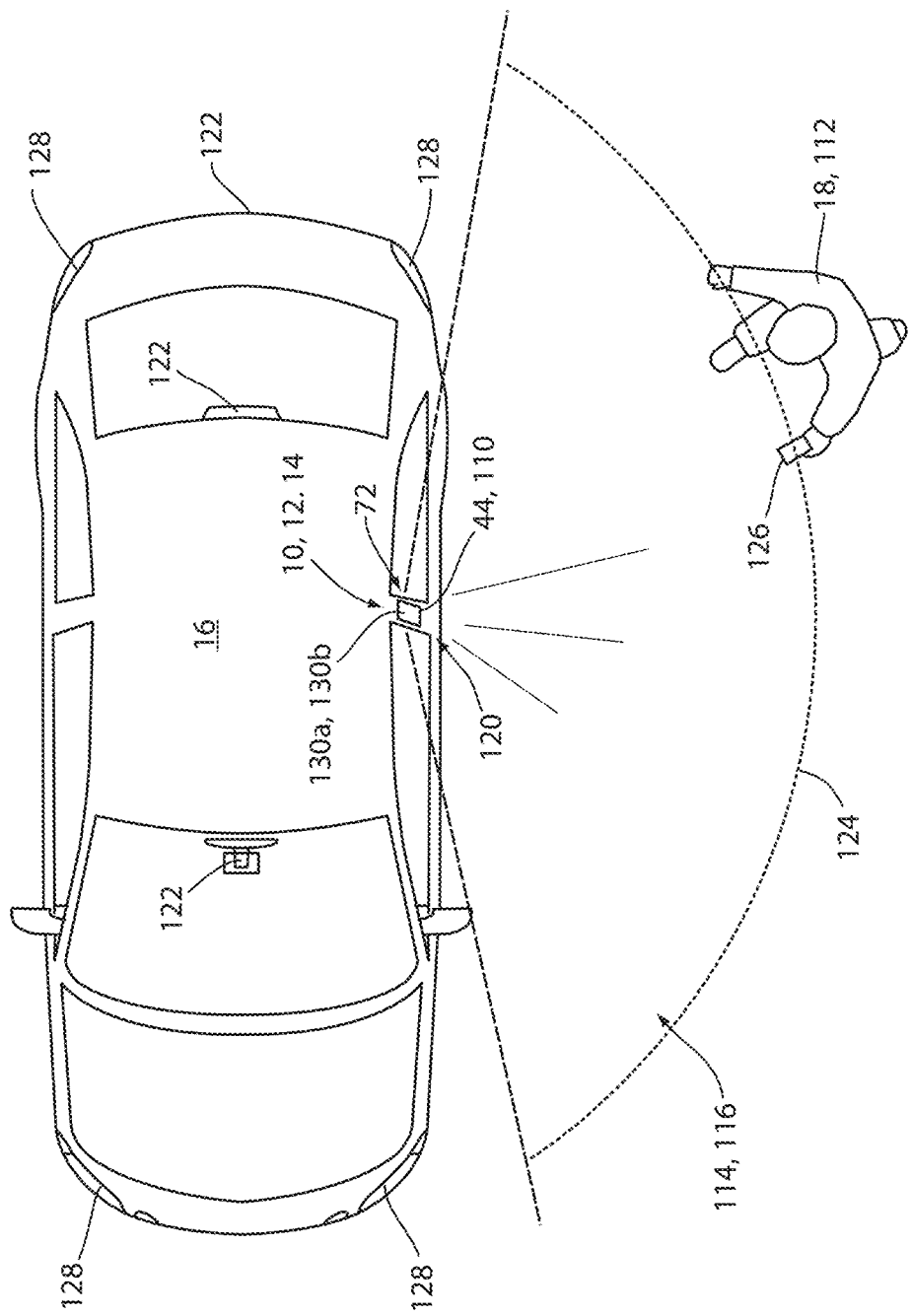
FIG. 6 is a top view of a vehicle comprising an authentication system.

FIG. 6 demonstrates a top view of the vehicle 16. Referring now to FIGS. 5 and 6, in some embodiments, the system 10 may be implemented to output one or more identification signals and/or status indicators. For example, if the vehicle 16 is operating on a roadway, the system 10 may utilize information from the sensors 120 to identify a nearby vehicle in the field of view 114 and/or detection region 116. In response to the detection, the system 10 may output a visual notification via the display screen 110 and/or one or more light sources 44. In this way, the system may selectively activate the display 110 and/or light sources 44 or indicators to provide a visual notification outside the vehicle 16.

In some embodiments, the controller of the system 10 may also be in communication with a vehicle control module. In such implementations, the system 10 may be configured to display a vehicle status via the display screen 110. For example, the controller may be configured to display various information on the display screen 110. The information may include, but not be limited to, a charge level, fuel level, inside temperature, a proximity, and/or various other information. In this way, the system 10 may be flexibly implemented to support various features and operation of the vehicle 16 as discussed herein.

In some embodiments, the display screen 110 and/or light sources 44 may be selectively activated to identify various states of the vehicle 16 and/or detections or information identified by the system 10. For example, the system 10 may be configured to identify a proximity of a key fob cellular phone, or various other communication enabled device. Such devices may generally be referred to as mobile devices 126 for clarity. In response to the detection of the mobile device 126 within a predetermined distance 124, the system 10 may be configured to activate the display screen 110 and/or light sources 44 to identify the vehicle 16 and/or greet the user 18. In similar examples, the system 10 may be configured to selectively activate the display screen 110 and/or the light source 44 or various additional lights 128 of the vehicle 16 in response to a signal or communication from the mobile device 126. In this configuration, the controller of the system 10 may be configured to selectively activate the display screen 110 and/or the light source 44 or various additional lights 128 of the vehicle 16 to identify a location of the vehicle 16, activate an alarm, and/or indicate a panic or alert mode.

In some embodiments, the scanning apparatus 12 may be configured to capture image data that may be displayed on the mobile device 126 or an access code provided on a permanent form of media. For example, in a ride-share setting, the user 18 may be provided with a code that may be displayed on a screen of the mobile device 126. In response to detecting the user 18 proximate to the vehicle (e.g. via the proximity sensor 72), the controller of the system 10 may be configured to control the image sensor 42 of the scanning apparatus 12 to capture image data depicting the code (e.g. a QR code, reference number, or security identifier). The controller may then process the image data to identify whether or not the code corresponds to an authorized use or access of the vehicle 16. In response to an authorized identification of the user 18 via the code and/or other authentication (e.g. biometric), the system 10 may be configured to selectively grant access or authorize the use of the vehicle 16.

In some embodiments, the system 10 may further comprise a microphone 130a and/or a speaker 130b. In such embodiments, the system 10 may be configured to communicate one or more instructions, greetings, and/or additional information to the user 18 and/or the person 112. For example, in the event that an individual (e.g. user 18) is authorized to access a compartment of the vehicle 16 (e.g. for a delivery, as a passenger, operation, etc.), the system 10 may output a message via the speaker 130b instructing the individual to access a specific portion (e.g. trunk, passenger compartment front, passenger compartment rear, etc.) to deliver a parcel or otherwise access the vehicle 16. Similarly, the controller of the system 10 may be configured to receive and communicate verbal questions via the microphone 130a. In some examples, the microphone 130a and the speaker 130b may be configured to operate as a communication interface for a telephonic or web-based communication. In such embodiments, the system 10 may be configured to send data recorded by the microphone 130a and receive audio information that may be output from the speaker 130b to support audio communications between the user 18 and a contact. Such communications may be enabled via the one or more communication circuits discussed in reference to FIG. 7.

In some embodiments, the vehicle 16 may further comprise a cabin monitoring system (e.g. an unattended child monitoring system), which may be configured to detect one or more passengers in the vehicle 16. The cabin monitoring system may comprise one of more image sensors, weight sensors, microphones, etc. configured to detect the presence of a living person or animal that may have been left behind in the cabin of the vehicle 16. In some examples, the authentication system 10 may be in communication with or form an integral component of the cabin monitoring system. In such examples, the authentication system 10 may serve as a detection and/or notification device that may be utilized to detect the user 18 departing from the vehicle 16 while still occupied and/or output an alert the user 18 indicating such a departure.

For example, the proximity sensor 72 may be utilized in combination with the cabin monitoring system to identify that the user 18 has departed from the vehicle 16 beyond the predetermined distance 124. Additionally, such a departure may be indicated based on the doors of the vehicle 16 being locked. In response to such a detection, the controller of the system 10 may selectively activate the display screen 110, one or more of the light sources 44, the additional lights 128 of the vehicle 16, the speaker 130b, a horn, and/or various indicators of the vehicle 16 to alert the user 18 of the departure of the occupied vehicle. Additionally, the system 10 may be configured to communicate an alert to the mobile device 126, an emergency contact, and/or an emergency responder via the communication circuit, further discussed in reference to FIG. 7. Accordingly, the system 10 may be implemented to provide and/or support a variety of vehicle systems without departing from the spirit of the disclosure.

Figure 7:
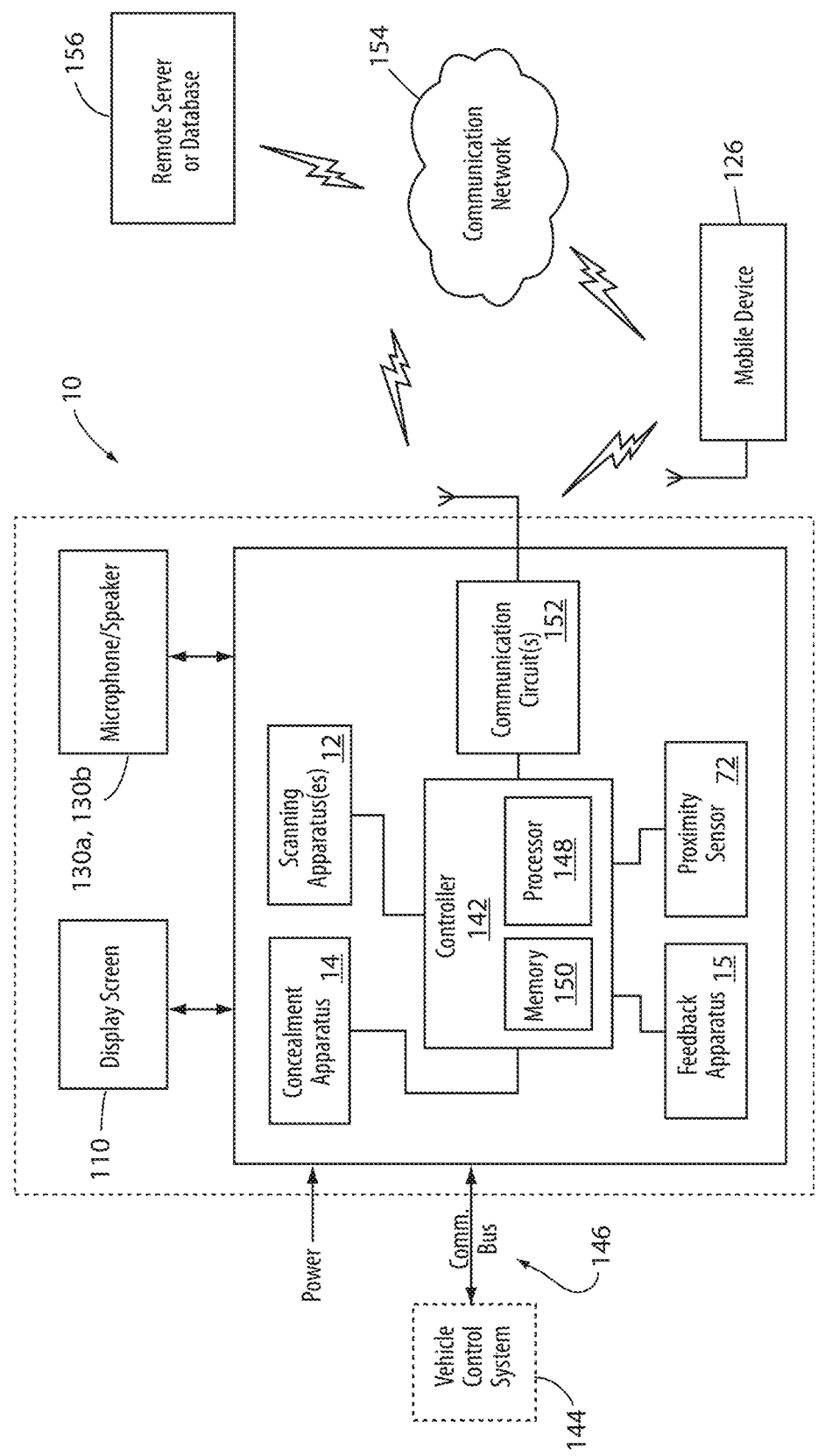
FIG. 7 is a block diagram of an identification system incorporating a scanning apparatus disposed in a mirror assembly in accordance with the disclosure.

Referring to FIG. 7, a block diagram of the system 10 incorporating the scanning apparatus 12 and the concealment apparatus 14 is shown. In FIG. 7, the controller 142 of the system 10 is shown in communication with the scanning apparatus 12 and the concealment apparatus 14. The controller 142 may further be in communication with a control module 144 via a communication bus 146 of the vehicle 16. The communication bus 146 may be configured to deliver signals to the controller 142 identifying various states of the vehicle 16. For example, the communication bus 146 may be configured to communicate to the controller 142 a drive selection of the vehicle 16, an ignition state, a door open or ajar status, a remote activation of the scanning apparatus 12, etc. Such information and control signals may be utilized by the controller 142 to activate or adjust various states and/or control schemes of the scanning apparatus 12 and the concealment apparatus 14.

The controller 142 may comprise a processor 148 having one or more circuits configured to control various operations of the system 10. The processor 148 may be in communication with a memory 150 configured to store instructions to control operations of the scanning apparatus 12. For example, the controller 142 may be configured to store one or more characteristics or profiles utilized by the controller 142 to identify the user 18 of the vehicle 16. In this configuration, the controller 142 may communicate operating and identification information with the scanning apparatus 12 to identify the user 18 of the vehicle 16. Additionally, based on the identification of the user 18, the controller 142 may be configured to control and/or communicate with additional systems of the vehicle 16. Such systems may include a security system, speed governor, radio/infotainment system, etc. In this way, one or more systems of the vehicle 16 may be controlled or restricted based on the identity of the user 18.

In some embodiments in response to an identification of a passenger or user 18 of the vehicle 16, the controller 142 may access a database of stored driver preferences to customize aspects of the vehicle 16. For example, the controller 142 may access and enable radio station presets according to a driver's pre-established preferences. Navigation and/or map display settings may be changed or set according to a driver's pre-established preferences. Additionally, the system 10 may be utilized to customize a seat position or height and adjust various operating parameters before the user 18 even enters vehicle 16. For example, the system may be operable to start the vehicle 16, activate a radio to a preconfigured station or playlist, and activate a climate control to a user setting. Additionally, the database may comprise navigation information comprising known or previously visited locations. In particular, a route to home, work, or other frequently visited locations may be preset upon identification of a driver based on previous use or programming stored in the database.

In an exemplary embodiment, the controller 142 may be configured to process image data received from the image sensor 42. In this configuration, the controller 142 may process the image data with one or more algorithms configured to determine an identity of the user 18 of the vehicle 16. With the identity of the user 18 or one or more passengers of the vehicle 16 identified, the controller 142 may further be operable to control various systems or functions of the vehicle 16.

Though discussed in exemplary reference to the vehicle 16, the system 10 may similarly be implemented to authenticate users to control access or entry through doors or access gates into various buildings, office structures, residences, etc. Similarly, the system 10 may be utilized to authorize various transactions (e.g. purchases, bank transactions, etc.) For example, in a residential setting, the system 10 may be in communication with a smart home system. In such embodiments, based on an authentication of the user 18, the system 10 may grant access to a door or gate of a home and control one or more devices in communication with the smart-home system to load specific settings or preferences of the user 18. Accordingly, the system 10 may be configured to suit a variety of applications without departing from the spirit of the disclosure.

In some embodiments, the controller 142 may utilize the identification of the user 18 of the vehicle 16 to report updates to an administrator of the system 10. For example, in some embodiments, the controller 142 may further comprise one or more communication circuits 152 configured to communicate via a communication network 154. Accordingly, the system 10 may be in communication with a remote server 156 and/or a mobile device 126 via the communication network 154. The communication network 154 may comprise one or more wireless or wired network interfaces or communication protocols. As discussed herein, wireless communication protocols may operate in accordance with communication standards including, but not limited to Institute of Electrical and Electronic Engineering (IEEE) 802.11 (e.g., WiFi™); Bluetooth®; advanced mobile phone services (AMPS); digital AMPS; global system for mobile communications (GSM); code division multiple access (CDMA); Long Term Evolution (LTE or 4G LTE); local multipoint distribution systems (LMDS); multi-channel-multi-point distribution systems (MMDS); RFID; and/or variations thereof. In this configuration, the controller 142 may be configured to send an alert or message to the administrator of the system 10 in response to one or more predetermined events. The alert or message may correspond to a text message, data message, email, alert via an application operating on a smart device, etc.

Referring now to FIGS. 5 and 7, the scanning apparatus 12 may be configured to capture image data that may be displayed on the mobile device 126 or an access code provided on a permanent form of media. For example, in a ride-share setting, the user 18 may be provided with a code that may be displayed on a screen of the mobile device 126. The controller 142 may be configured to control the image sensor 42 of the scanning apparatus 12 to capture image data depicting the code (e.g. a QR code, reference number, or security identifier). The controller 142 may then process the image data to identify whether or not the code corresponds to an authorized use or access of the vehicle 16. In response to an authorized identification of the user 18 via the code and/or other authentication (e.g. biometric), the system 10 may be configured to selectively grant access or authorize the use of the vehicle 16.

Similarly, in some implementations, the system 10 may be configured to display a code on the display screen 110, which may be captured or entered into the mobile device 126 by the user 18. Upon receiving or capturing the code, the mobile device 126 may communicate the code to the system via the communication network 154. The code may then be identified and/or authenticated via the remote server 156 and/or directly by the controller 142 of the vehicle 16. In this configuration, the system may be configured to communicate information via the display screen 110 that may be input into or captured by the mobile device 126 to assist or otherwise facilitate authorized access or use of the vehicle 16.

In some examples, the system 10 may also be configured to communicate a notification of a failed authentication attempt, unauthorized access attempt, nearby object or person notification, etc. Such a notification may be communicated to the mobile device 126 of an owner or authorized user of the vehicle 16. The notification may be communicated from a controller 142 of the system 10 to the mobile device 126 and/or additional remote devices via the one or more communication circuits 152. Accordingly, the system 10 may be configured to communicate a notification to the mobile device 126 and/or output a variety of notifications related to the operation of the system 10, the vehicle 16, etc.

The system 10 may further comprise the microphone 130*a* and/or the speaker 130*b*. In such embodiments, the system 10 may be configured to communicate one or more instructions, greetings, and/or additional information to the user 18 and/or the person 112. For example, in the event that an individual (e.g. user 18) is authorized to access a compartment of the vehicle 16 (e.g. for a delivery, as a passenger, operation, etc.), the system 10 may output a message via the speaker 130*b* instructing the individual to access a specific portion (e.g. trunk, passenger compartment front, passenger compartment rear, etc.) to deliver a parcel or otherwise access the vehicle 16.

Similarly, the controller 142 of the system 10 may be configured to receive and communicate verbal questions via the microphone 130*a*. In some examples, the microphone 130*a* and the speaker 130*b* may be configured to operate as a communication interface for a telephonic or web-based communication. In such examples, the system 10 may be configured to send data recorded by the microphone 130*a* and receive audio information that may be output from the speaker 130*b* to support audio communications between the user 18 and a contact. Such communications may be enabled via the one or more communication circuits 152.

In some examples, the image sensor 42, the light source 44, the proximity sensor 72, the display device 110, and/or various other devices in communication with the system 10 may be implemented in combination with additional systems of the vehicle 16. For example, the system 10 may be implemented as a component or controller of a camera monitoring system and/or advanced driver assistance system (ADAS). Additionally, the image data captured by the image sensor 42 may be combined by the controller with additional image data captured by additional image sensors 122 as discussed herein. Similarly, the proximity sensor 72 and/or the image sensor 122 may be utilized as a sensor of a blind spot monitoring system, a lane keeping system, or various other assistance systems that may be implemented for the vehicle 16.

Referring again to FIG. 7, the electro-optic device 20 of the concealment apparatus 14 may correspond to an electrochromic element. The electrochromic element may comprise an electrochromic medium, which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase. The electrochromic component may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Preselected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration-Enhanced Stability, Process for the Preparation Thereof and Use in Electrochromic Devices," U.S. Pat. No. 6,519,072, entitled "Electrochromic Device"; and International Patent Publication Nos. WO 98/42796 entitled "Electrochromic Polymeric Solid Films, Manufacturing Electrochromic Devices Using Such Solid Films, and Processes For Making Such Solid Films And Devices," and WO 99/02621 entitled "Electrochromic Polymer Systems," which are herein incorporated by reference in their entirety.

It will be appreciated that embodiments of the invention described herein may be comprised of one or more conventional processors and unique stored program instructions that control one or more processors to implement, in conjunction with certain non-processor circuits, some, most, or all of the functions of the concealment apparatus 14, as described herein. The non-processor circuits may include but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described invention and other components is not limited to any specific material. Other exemplary embodiments of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle monitoring system configured to monitor a scanning region depicting a subject, the system comprising:
   a monitoring apparatus configured to capture scanning data in the scanning region depicting the subject;
   a feedback apparatus configured to communicate alignment information from a portion of the vehicle to the subject, wherein the alignment information indicates an alignment of the subject in the scanning region;
   a concealment apparatus configured to conceal the monitoring apparatus and transmit the alignment information from the feedback apparatus; and
   a controller in communication with the monitoring apparatus and the feedback apparatus, wherein the controller is configured to:
      activate the feedback apparatus revealing the alignment information identifying the alignment of the subject within the scanning region of the monitoring apparatus;
      control the monitoring apparatus to capture the scanning data of the subject; and
      monitor the subject in the scanning data.

2. The monitoring system according to claim 1, wherein the controller is further configured to capture the scanning data depicting identifying information of the user.

3. The monitoring system according to claim 1, further comprising:
   a proximity sensor in communication with the controller, wherein the proximity sensor is configured to communicate a detection signal identifying the subject in the scanning region.

4. The monitoring system according to claim 3, wherein the controller is further configured to:
   detect an object within the scanning region in response to the detection signal; and
   communicate the detection to a driver assistance system.

5. The monitoring system according to claim 3, wherein the controller is further configured to:
   activate the feedback apparatus in response to the detection signal identifying the subject within the scanning region.

6. The monitoring system according to claim 3, wherein the concealment apparatus comprises an electro-optic device configured to transmit the alignment information.

7. The monitoring system according to claim 6, wherein the controller is further configured to:
   control the electro-optic device to change from a concealed configuration to a scanning configuration in response to the detection signal identifying the subject in the scanning region.

8. The monitoring system according to claim 6, wherein the electro-optic device is configured to selectively transmit light demonstrating the alignment information emitted from the feedback apparatus.

9. The monitoring system according to claim 1, wherein the feedback apparatus comprises one or more light indicators disposed behind the concealment apparatus relative to a position of the subject, and the controller is configured to activate the one or more light indicators identifying the alignment or a misalignment of the subject in the scanning region.

10. The monitoring system according to claim 9, wherein the controller is further configured to process an identification of the subject based on the scanning data and control the one or more light indicators identify a status of the identification.

11. The monitoring system according to claim 6, wherein the electro-optic device comprises an electrochromic device.

12. A method for presenting alignment information for aligning a subject within a scanning region of a monitoring apparatus, the method comprising:
 capturing scanning data in the scanning region depicting the subject;
 activating a feedback apparatus displaying alignment information on a portion of the vehicle, wherein the alignment information indicates an alignment of the subject in the scanning region;
 updating the alignment information for the monitoring apparatus displayed to the subject based on a position of the subject in the scanning region;
 transmitting the alignment information from the feedback apparatus through a concealment apparatus configured to conceal the monitoring apparatus; and
 monitoring the subject in the scanning data.

13. The method according to claim 12, further comprising:
 detecting the subject within a scanning proximity of the monitoring apparatus.

14. The method according to claim 13, further comprising:
 in response to detecting the subject within the scanning proximity, controlling a feedback apparatus to display the alignment information through the concealment device.

15. The monitoring system according to claim 12, wherein monitoring the subject in the scanning data comprises identifying an occupancy status of a cabin of the vehicle based on the scanning data.

16. The monitoring system according to claim 12, further comprising:
 processing the scanning data to control one or more systems of the vehicle as an input to an advanced driver assistance system (ADAS).

17. The monitoring system according to claim 12, further comprising:
 processing the scanning data demonstrating a portion of the subject thereby identifying the subject as an authorized or unauthorized user.

18. The method according to claim 17, further comprising:
 selectively activating at least one system of the vehicle in response to identifying the subject as an authorized user.

19. The method according to claim 12, wherein updating the alignment information for the monitoring apparatus displayed to the subject comprises controlling one or more visual indicators identifying the alignment or a misalignment of the subject in the scanning region.

20. A vehicle monitoring system configured to monitor a scanning region depicting a subject, the system comprising:
 a monitoring apparatus configured to capture scanning data in the scanning region depicting the subject;
 a proximity sensor in communication with the controller, wherein the proximity sensor is configured to communicate a detection signal identifying the subject in the scanning region;
 a feedback apparatus configured to communicate alignment information from a portion of the vehicle to the subject, wherein the alignment information indicates an alignment of the subject in the scanning region;
 a concealment apparatus configured to conceal the monitoring apparatus and transmit the alignment information from the feedback apparatus; and
 a controller in communication with the monitoring apparatus and the feedback apparatus, wherein the controller is configured to:
  activate the feedback apparatus revealing the alignment information identifying the alignment of the subject within the scanning region of the monitoring apparatus;
  control the monitoring apparatus to capture the scanning data of the subject based on the detection signal; and
  monitor the subject in the scanning data, where monitoring the subject comprises capturing the scanning data depicting identifying information.

* * * * *